US010993445B2

(12) United States Patent
Cully et al.

(10) Patent No.: US 10,993,445 B2
(45) Date of Patent: *May 4, 2021

(54) NON-MEAT FOOD PRODUCTS HAVING APPEARANCE AND TEXTURE OF COOKED MEAT

(71) Applicant: Société des Produits Nestlé S.A., Vevey (CH)

(72) Inventors: Kevin J. Cully, Chesterfield, MO (US); Pieter Berends, Zoznegg-Muhlingen (DE); Gregory W Trottet, Rennaz (CH)

(73) Assignee: Société des Produits Nestlé S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,010

(22) Filed: Sep. 19, 2019

(65) Prior Publication Data

US 2020/0008433 A1 Jan. 9, 2020

Related U.S. Application Data

(63) Continuation of application No. 14/876,228, filed on Oct. 6, 2015, now Pat. No. 10,470,470.

(Continued)

(51) Int. Cl.
*A21D 2/36* (2006.01)
*A23K 10/30* (2016.01)
(Continued)

(52) U.S. Cl.
CPC ............... *A21D 2/36* (2013.01); *A23J 3/18* (2013.01); *A23J 3/227* (2013.01); *A23K 10/30* (2016.05);
(Continued)

(58) Field of Classification Search
CPC ..................................................... A21D 2/36
See application file for complete search history.

(56) References Cited

U.S. PATENT DOCUMENTS

| 5,433,968 A | 7/1995 | Zarraga et al. |
| 6,319,539 B1 | 11/2001 | Shemer et al. |

(Continued)

FOREIGN PATENT DOCUMENTS

| CN | 1045913 A | 10/1990 |
| CN | 101998831 A | 3/2011 |

(Continued)

OTHER PUBLICATIONS

"Continuous" Definition from Merriam-Webster Dictionary Retrieved Mar. 28, 2018 https://www.merriam-webster.com/dictionary/continuous (Year: 2018).

(Continued)

*Primary Examiner* — Katherine D Leblanc
(74) *Attorney, Agent, or Firm* — K&L Gates LLP

(57) ABSTRACT

Non-meat food products are provided that have the appearance and the texture of cooked meat. Methods for making such non-meat food products are also provided. In an embodiment, a method includes mixing dry ingredients comprising vegetable proteins with wet ingredients including water and/or oil to form a non-meat dough; heating the non-meat dough under pressure; maintaining the pressure while transferring the heated non-meat dough to a cooling device; and gradually cooling the heated non-meat dough while gradually decreasing pressure on the heated non-meat dough, to form a non-meat food product. The mixing can be performed by a batch or continuous mixer; the heating can be performed by a device selected from the group consisting (Continued)

of a high shear emulsifier, a heat exchanger, and a dielectric heater; and the gradual cooling can be performed by a heat exchanger.

20 Claims, 2 Drawing Sheets

Related U.S. Application Data

(60) Provisional application No. 62/062,275, filed on Oct. 10, 2014.

(51) Int. Cl.
*A23K 50/40* (2016.01)
*A23J 3/18* (2006.01)
*A23L 33/185* (2016.01)
*A23J 3/22* (2006.01)
*A23L 33/115* (2016.01)
*A23K 20/147* (2016.01)
*A23K 20/158* (2016.01)

(52) U.S. Cl.
CPC .......... *A23K 20/147* (2016.05); *A23K 20/158* (2016.05); *A23K 50/40* (2016.05); *A23L 33/115* (2016.08); *A23L 33/185* (2016.08); *A23V 2002/00* (2013.01)

(56) References Cited

U.S. PATENT DOCUMENTS

| | | | |
|---|---|---|---|
| 6,379,738 | B1 | 4/2002 | Dingman et al. |
| 6,613,369 | B2 | 9/2003 | Gaebler et al. |
| 6,649,206 | B2 | 11/2003 | Dingman et al. |
| 7,556,836 | B2 | 7/2009 | Mueller et al. |
| 7,736,686 | B2 | 6/2010 | Dingman et al. |
| 7,838,057 | B2 | 11/2010 | Schmidt et al. |
| 2007/0104833 | A1 | 5/2007 | Yokoyama et al. |
| 2007/0148323 | A1 | 6/2007 | Dingman et al. |
| 2007/0269567 | A1 | 11/2007 | McMindes et al. |
| 2009/0291188 | A1 | 11/2009 | Milne et al. |
| 2012/0008994 | A1 | 1/2012 | Tomita |
| 2012/0093994 | A1 | 4/2012 | Hsieh et al. |
| 2012/0156355 | A1 | 6/2012 | Milne et al. |
| 2012/0189751 | A1 | 7/2012 | Beinecke et al. |
| 2013/0015944 | A1 | 1/2013 | Takeda |
| 2014/0242228 | A1 | 8/2014 | Nadeau et al. |

FOREIGN PATENT DOCUMENTS

| | | |
|---|---|---|
| EP | 0310375 | 4/1989 |
| EP | 1493337 | 1/2005 |
| EP | 1758462 | 3/2007 |
| EP | 2063719 | 6/2009 |
| WO | 2009114077 | 9/2009 |
| WO | 2011011456 | 1/2011 |
| WO | 2012008994 A2 | 1/2012 |
| WO | 2012009548 | 1/2012 |
| WO | 2012103056 | 8/2012 |
| WO | 2013015944 A2 | 1/2013 |
| WO | 2016055940 A1 | 4/2016 |

OTHER PUBLICATIONS

International Search Report and Written Opinion to PCTIB2015057644 dated Dec. 14, 2015.
USDA National Nutrient Database "Soybeans, nature seeds, raw" https://ndb.nal.usda.gov/ndb/foods/show/4845?fgcd=&manu=&lfacet=&format=Full&count=&max=35&offset=&sort=&qlookup=1 6108.

FIG. 2

| | Ingredients | Example 1 | Example 2 | Example 3 | Example 4 | Example 5 |
|---|---|---|---|---|---|---|
| Liquids | Water | 45.5% | 45.5% | 45.5% | 45.5% | 66.7% |
| | Vegetable Oil | 9.1% | 9.1% | 9.1% | 9.1% | 3.0% |
| | Subtotal Liquids | 54.5% | 54.5% | 54.5% | 54.5% | 69.7% |
| Dries | Wheat Gluten Powder (vital) | 38.9% | 28.0% | 14.1% | 35.2% | 25.0% |
| | Chickpea Powder | 2.7% | 0.0% | 0.0% | 6.8% | 1.5% |
| | Maltodextrin (5-8 DE) Powder | 1.8% | 1.8% | 1.8% | 2.9% | 1.5% |
| | Rice flour | 0.0% | 13.6% | 0.0% | 0.0% | 0.0% |
| | Corn Starch | 0.0% | 0.0% | 27.5% | 0.0% | 0.0% |
| | Vitamins/Minerals/Flavors/Colors | 2.0% | 2.0% | 2.0% | 0.5% | 2.3% |
| | Total | 100.0% | 100.0% | 100.0% | 100.0% | 100.0% |

NON-MEAT FOOD PRODUCTS HAVING APPEARANCE AND TEXTURE OF COOKED MEAT

PRIORITY CLAIMS

This application is a continuation of U.S. application Ser. No. 14/876,228 filed Oct. 6, 2015, which claims priority to Provisional Appl. Ser. No. 62/062,275 filed on Oct. 10, 2014, the entire contents of which are incorporated herein by reference.

BACKGROUND

The present disclosure generally relates to non-meat food products for humans or animals such as pets. More specifically, the present disclosure relates to non-meat food products having the appearance and the texture of cooked meat and also relates to methods for making such non-meat food products.

One of the primary nutritional features of meat is its protein content. However, the production of meat is relatively inefficient in terms of feed input to food output. Accordingly, non-meat food products can achieve a desired protein content using inexpensive by-products from certain crops such as soybeans. Furthermore, some individuals abstain from the consumption of meat for any of a variety of reasons. Moreover, many pet owners feed or wish to feed meatless diets to their companion animals.

Nevertheless, many of the existing non-meat food analogs are produced using extrusion or non-continuous processes. These existing processes produce texturized non-meat food products that do not mimic the texture or the taste of real meat products. As a result, consumers typically consider such non-meat food products to be unappealing and unpalatable.

SUMMARY

The processes of the present disclosure allow the continuous production of non-meat food analogs that have the resemblance of real meat, without the use of extrusion. High shear heating or another heating method can be used in conjunction with non-meat proteins to produce a realistic-looking non-meat product. The texturized products produced from these processes can be further enhanced by adding flavouring systems, coloring, and/or texturization agents and can be fortified to improve the nutritional value of the product.

Accordingly, in a general embodiment, the present disclosure provides a method comprising: mixing dry ingredients comprising vegetable proteins with wet ingredients comprising at least one of water or oil to form a non-meat dough; heating the non-meat dough under pressure; and gradually cooling the heated non-meat dough to form a non-meat food product.

In an embodiment, the heated non-meat dough undergoes gradually decreasing pressure during the gradual cooling.

In an embodiment, the method comprises pumping the non-meat dough from a device that performs the mixing to a device that performs the heating, without any processing therebetween.

In an embodiment, the method comprises maintaining the pressure on the heated non-meat dough during transfer from a device that performs the heating to a device that performs the gradual cooling, without any processing therebetween.

In an embodiment, the mixing is performed by a batch or continuous mixer.

In an embodiment, the heating is performed by a device selected from the group consisting of a high shear emulsifier, a heat exchanger, and a dielectric heater.

In an embodiment, the non-meat dough is an emulsion.

In an embodiment, the non-meat dough resulting from the mixing has a moisture content of 40% to 67%.

In an embodiment, the dry ingredients comprise wheat gluten in an amount of 15% to 45% relative to the non-meat dough resulting from the mixing.

In an embodiment, the wet ingredients comprise the oil in an amount of 3% to 14% relative to the non-meat dough resulting from the mixing.

In an embodiment, the oil is selected from the group consisting of soybean oil, corn oil, sunflower oil, high oleic sunflower oil, olive oil, canola oil, safflower oil, peanut oil, palm oil, cottonseed oil, coconut oil, almond oil, hazelnut oil, grapeseed oil, and combinations thereof.

In an embodiment, the heating is performed at a temperature of 110° C. to 180° C.

In an embodiment, the non-meat dough undergoes the heating while at a pressure from 4.8 bar to 34.5 bar.

In an embodiment, the method comprises mixing the non-meat food product with at least one of a gravy, a gel, or a condiment.

In an embodiment, the dry ingredients comprise at least one of a starch flour or a legume flour.

In an embodiment, the gradual cooling is performed by a heat exchanger.

In another embodiment, a non-meat composition is provided. The composition is made by a process comprising: mixing dry ingredients comprising vegetable proteins with wet ingredients comprising at least one of water or oil to form a non-meat dough; heating the non-meat dough under pressure; gradually cooling the heated non-meat dough while gradually decreasing pressure on the heated non-meat dough, to form a non-meat food product; and using the non-meat food product as at least a portion of the non-meat composition.

In an embodiment, the non-meat composition is formulated for consumption by a human.

In an embodiment, the non-meat composition is formulated for consumption by a pet.

In another embodiment, the present disclosure provides a method comprising using vegetable proteins to produce a non-meat emulsion that has a texture and an appearance of cooked meat.

An advantage of the present disclosure is to provide non-meat food products that have a more realistic meat-like appearance and flavor properties and also have a texture similar to real meat products.

Another advantage of the present disclosure is to allow product nutritional profiles to be tailored to different market segments.

Still another advantage of the present disclosure is to allow the development of new products for the vegetarian and health food markets.

An additional advantage of the present disclosure is to improve the textural attributes of non-meat food products.

Another advantage of the present disclosure is to increase the palatability of non-meat food products.

Yet another advantage of the present disclosure is to provide non-meat food products that have greater appeal for humans.

Another advantage of the present disclosure is to provide non-meat food products that have greater appeal for pets.

Yet another advantage of the present disclosure is to provide a non-meat emulsion food product that has a very realistic, meat-like appearance.

Another advantage of the present disclosure is to provide non-meat food products that have a strong bite/mouthfeel that is not pasty, mushy or brittle.

Additional features and advantages are described in, and will be apparent from, the following Detailed Description and the Figures.

BRIEF DESCRIPTION OF THE DRAWINGS

FIG. 2 is a table showing non-limiting examples of ingredient mixes than can be used in the methods provided by the present disclosure.

DETAILED DESCRIPTION

Figure 1:
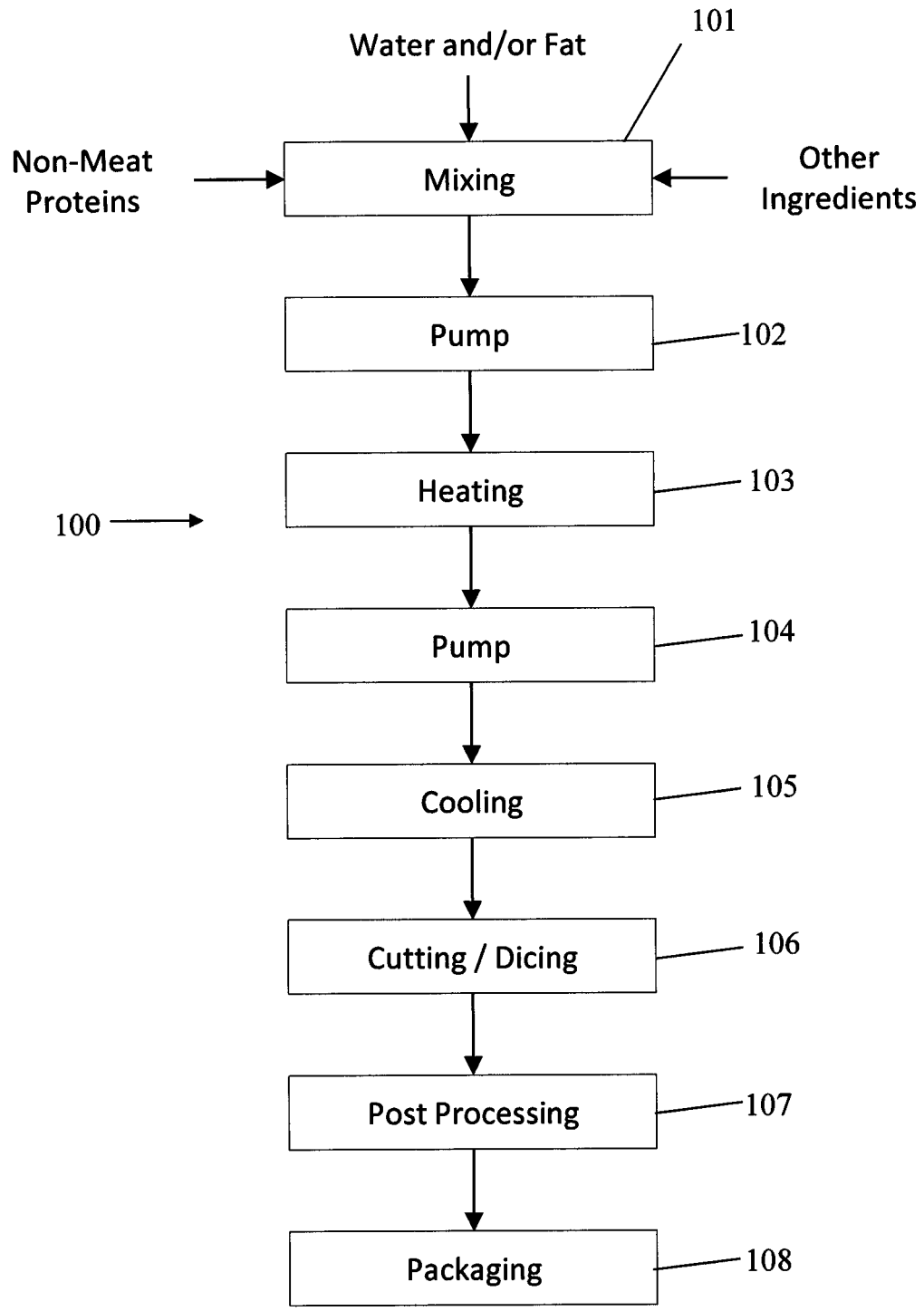
FIG. 1 is a flowchart showing an embodiment of a method provided by the present disclosure.

All percentages expressed herein are by weight of the total weight of the composition unless expressed otherwise. When reference is made to the pH, values correspond to pH measured at 25° C. with standard equipment. As used herein, "about" is understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. Moreover, all numerical ranges herein should be understood to include all integers, whole or fractions, within the range.

The terms "food," "food product" and "food composition" mean a product or composition that is intended for ingestion by an animal, including a human, and provides at least one nutrient to the animal. The present disclosure is not limited to a specific animal. The term "pet food" means any composition intended to be consumed by a pet. The term "chunks" means a plurality of separate food bodies, and preferably the food bodies are made by slicing the non-meat emulsion disclosed herein into separate pieces.

The term "pet" means any animal which could benefit from or enjoy the compositions provided by the present disclosure. For example, the pet can be an avian, bovine, canine, equine, feline, hicrine, lupine, murine, ovine, or porcine animal, but the pet can be any suitable animal. The term "companion animal" means a dog or a cat.

A "non-meat" food product is a composition in which meat (i.e. skeletal tissue and non-skeletal muscle from mammals, fish and fowl) and meat by-products (i.e. the non-rendered clean parts, other than meat, derived from slaughtered mammals, fowl or fish) are completely absent.

The terms "enhanced," "improved" or "increased" that are used with features of the non-meat food products of the present disclosure, such as texture, palatability and appearance, are in reference to known non-meat food products. "Palatability" refers to a quality of a comestible composition that makes the composition appealing or pleasing to one or more of an animal's senses, particularly the senses of taste and smell. As used herein, whenever an animal shows a preference, for example, for one of two or more foods, the preferred food is more "palatable" and has greater "palatability." For companion animals and other non-human animals, the relative palatability of one food compared to one or more other foods can be determined, for example, in side-by-side, free-choice comparisons, e.g., by relative consumption of the foods, or other appropriate measures of preference indicative of palatability.

As used herein and in the appended claims, the singular form of a word includes the plural, and vice versa, unless the context clearly dictates otherwise. Thus, the references "a," "an" and "the" are generally inclusive of the plurals of the respective terms. For example, reference to "an ingredient" or "a method" includes a plurality of such "ingredients" or "methods."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. Where used herein, the term "example," particularly when followed by a listing of terms, is merely exemplary and illustrative, and should not be deemed to be exclusive or comprehensive. Any embodiment disclosed herein can be combined with any other embodiment disclosed herein.

As generally illustrated in FIG. 1, the present disclosure provides a method 100 for producing a texturized non-meat emulsion with the appearance and the texture of cooked meat. The method 10 can comprise (i) mixing dry ingredients comprising vegetable proteins with wet ingredients comprising at least one of water or oil to form a non-meat dough; (ii) heating the non-meat dough under pressure in a heating device; and (iii) maintaining the pressure on the hot non-meat dough during transfer from the heating device to a cooling device; and (iv) gradually cooling the non-meat dough, preferably while gradually reducing the pressure, to form a fibrous slab of meaty appearance.

More specifically with respect to FIG. 1, the method 100 can comprise mixing the dry ingredients with wet ingredients in a mixing device to form a non-meat dough in Step 101. Preferably the mixing device is a batch or continuous mixer. The dry ingredients comprise vegetable proteins, and the wet ingredients comprise at least one of water or oil. The oil is preferably vegetable oil. In an embodiment, the resultant non-meat dough has a moisture content of 40% to 67%, preferably about 50%. FIG. 2 is a table showing non-limiting examples of ingredient mixes than can be used in the methods provided by the present disclosure.

Non-limiting examples of suitable vegetable proteins include pea protein, corn protein (e.g., ground corn or corn gluten), wheat protein (e.g., ground wheat or wheat gluten such as vital wheat gluten), legume protein such as soy protein (e.g., soybean meal, soy concentrate, or soy isolate), rice protein (e.g., ground rice or rice gluten) and combinations thereof. If flour is used, it will also provide some protein. Therefore, a material can be used that is both a vegetable protein and a flour. Preferably, the dry ingredients comprise wheat gluten in an amount of 15% to 45% of the total mixture (dry+wet ingredients), more preferably about 35% of the total mixture.

The dry ingredients can comprise an ingredient that is a starch flour. Non-limiting examples of suitable starch flours include cereal flours, such as those from rice, wheat, corn, barley, and sorghum; root vegetable flours, such as those from potato, cassava, sweet potato, arrowroot, yam, and taro; and other flours, such as sago, banana, plantain, and breadfruit flour. Preferably, the dry ingredients comprise the starch flour in an amount of 2% to 15% of the total mixture (dry+wet ingredients), more preferably about 5% of the total mixture.

The dry ingredients can comprise an ingredient that is a legume flour. Non-limiting examples of suitable legume flours include flours from beans such as favas, lentils, mung beans, peas, chickpeas, and soybeans. Preferably legume flour, if any, is present in an amount up to 20% of the total mixture (dry+wet ingredients).

Non-limiting examples of suitable oils include soybean oil, corn oil, sunflower oil, high oleic sunflower oil, olive oil, canola oil, safflower oil, peanut oil, palm oil, cottonseed oil, coconut oil, almond oil, hazelnut oil, grapeseed oil, and combinations thereof. Preferably the wet ingredients comprise the oil in an amount of 3% to 14% of the total mixture (dry+wet ingredients), preferably about 4.5% of the total mixture.

The dry ingredients can also comprise one or more vitamins, minerals, flavors, and colors. Non-limiting examples of suitable flavors include yeast, tallow, and the like. Non-limiting examples of suitable colors include FD&C colors, such as blue no. 1, blue no. 2, green no. 3, red no. 3, red no. 40, yellow no. 5, yellow no. 6, and the like; natural colors, such as caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan. Non-limiting examples of suitable vitamins include Vitamins A, B-complex (such as B-1, B-2, B-6 and B-12), C, D, E and K, niacin, and acid vitamins such as pantothenic acid, folic acid and biotin. Non-limiting examples of suitable minerals include calcium, iron, zinc, magnesium, iodine, copper, phosphorus, manganese, potassium, chromium, molybdenum, selenium, nickel, tin, silicon, vanadium, boron and the like.

Specific amounts for each additional ingredient will depend on a variety of factors such as the identity of the ingredient; the species of animal; the animal's age, body weight, general health, sex, and diet; the animal's consumption rate; the purpose for which the food product is administered to the animal; and the like. Therefore, the components and their amounts may vary widely.

Referring again to FIG. 1, the non-meat dough can be transferred, for example by pumping, from the mixing device in Step 102. Preferably the non-meat dough is transferred from the mixing device to a heating device. In Step 103, the non-meat dough can be heated by the heating device. In an embodiment, the non-meat dough is transferred directly from the mixing device to the heating device without any other processing such as extrusion or addition or removal of ingredients.

In an embodiment, the non-meat dough is uniformly mixed before the heating thereof. Therefore, the method 100 can comprise pre-emulsifying the non-meat dough before Step 103, for example by addition of an emulsifier during Step 101.

In an embodiment, the heating device is a high shear emulsifier (e.g. a pipe through which the non-meat dough passes, containing a rotor or impeller together with a stator), a heat exchanger (e.g. a concentric heat exchanger formed by two overlapping tubes), and/or a dielectric heater (e.g. a conductive material having its temperature raised by a high-frequency electromagnetic field). Preferably the non-meat dough is heated to a temperature from 110° C. to 180° C., more preferably 138° C. to 166° C., most preferably about 154° C. Preferably the non-meat dough undergoes the heating at a pressure from 4.8 bar to 34.5 bar, preferably about 17.2 bar.

In Step 104, the pressure is maintained as the hot non-meat dough is transferred, for example by pumping, from the heating device. Preferably the hot non-meat dough is transferred from the heating device to a cooling device, such as a heat exchanger. In Step 105, the hot non-meat dough can be gradually cooled by the cooling device. In an embodiment, the non-meat dough is transferred directly from the heating device to the cooling device without any other processing such as extrusion or addition or removal of ingredients.

Preferably a high pressure positive displacement pump is used to transfer the product from the heating device to the cooling device. The pump can control pressure at the outlet of the heating device to prevent moisture flashing and/or can provide pressure at the outlet of the pump to push the hot non-meat dough into and through the cooling device.

During the cooling in Step 105, both the temperature and the pressure are gradually reduced as the heated non-meat dough travels through the cooling device. The dough has moisture and is under elevated temperature, so preferably moisture flashing is controlled to avoid rapid expansion of the food product. Product expansion that is too rapid can disrupt the structure of the texturized food product. However, depending on the desired image of the final food product, some flashing may be required to reduce the temperature of the center of the food product and/or to expose some of the fibers in the food product. In an embodiment, the non-meat dough undergoes a decrease in pressure at a predetermine rate in the cooling device and/or is subjected to a predetermined final pressure at the end of the cooling device.

In Step 106, the texturized food product exiting the heat exchanger can be cut and/or shaped directly in-line or off-line. For example, an exit plate on the heat exchanger can shape the product as the product departs the heat exchanger. Each of the exit plates can have one or more orifices that impart a desired shape on the product travelling through the exit plate. Each exit plate is preferably directly attached to a corresponding outlet of the heat exchanger so that the product exiting the heat exchanger and being shaped by the exit plate occurs substantially simultaneously as one step.

As another example, one or more grids of static or vibrating knives can be attached on the heat exchanger. These knife grids can have vertical, horizontal and/or diagonal knives, depending on the shape of the food product to be manufactured. If more defined shapes are required, a cutting die with a more complex design can be fitted to each of the one or more outlets of the heat exchanger array.

In conjunction with the knife grids or cutting dies, if any, a rotating or similar type cross-cutting device can be attached. This cross-cutting device allows the exiting material to be cut to the required thickness or length. The speed of the cross-cutter can be automatically controlled depending on product flow rates, for example by a processor.

In Step 107, the texturized non-meat food product can optionally be mixed with one or more of gravy, a gel, or a condiment such as parsley, oregano, and the like to form a chunk-and-gravy, a stew or a similar type food composition.

In Step 108, the chunk-and-gravy or other form of the texturized non-meat product can be filled and sealed into a package. Non-limiting examples of suitable packaging types include cans, pouches, glass container, plastic containers. Packaging of the non-meat food product can comprise retorting the food-product in the packaging under timetemperature conditions sufficient to effect commercial sterilization. Typically, a retorting temperature of about 118° C. to 121° C. for approximately 40 to 90 minutes is satisfactory in producing a commercially sterile product.

In some embodiments, at least a portion of Step 107 can occur substantially simultaneously with at least a portion of Step 108. For example, the texturized non-meat food product can be mixed with the one or more gravy, gel, or condiment in the packaging.

In an embodiment, a suitable gravy may be prepared by heating a mixture of water, starch, and condiments. The texturized non-meat food product can have the form of chunks, and the chunks and the gravy can be filled into cans in desired proportions.

In an embodiment, the texturized product can also be refrigerated, frozen, fried, dried, aseptically processed, or processed in another way to make the product shelf stable in Step 107. The product can then be packaged into any of a variety of different packages in Step 108.

In a preferred embodiment, the method 100 is completely free of an extrusion step, and the resultant non-meat product is not made by extrusion.

In an other aspect of the present disclosure, a texturized non-meat food product made by the processes disclosed herein is provided. Such a food product has a texture and an appearance that resembles a real meat food product. Moreover, such a food product has enhanced palatability relative to known non-meat food products.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of production of a non-meat food product without use of extrusion, the method comprising:
   mixing (i) dry ingredients comprising vegetable protein with (ii) wet ingredients comprising oil to form a non-meat dough;
   pumping the non-meat dough to at least maintain the dough under pressure and then heating the non-meat dough under pressure, wherein the heating is performed at a temperature of 138° C. to 180° C., and the pressure is from 4.8 bar to 34.5 bar;
   pumping the heated non-meat dough in a high pressure positive displacement pump after the heating; and
   gradually cooling the heated non-meat dough to form a non-meat food product, wherein the heated non-meat dough undergoes gradually decreasing pressure during the gradual cooling.

2. The method of claim 1, wherein the oil is 3 wt. % to 14 wt. % of the non-meat dough.

3. The method of claim 1, wherein the pumping of the non-meat dough prior to the heating comprises pumping the non-meat dough from a device that performs the mixing to a device that performs the heating, without any processing therebetween.

4. The method of claim 1 comprising maintaining the pressure on the heated non-meat dough during transfer from a device that performs the heating to a device that performs the gradual cooling, without any processing therebetween.

5. The method of claim 1, wherein the oil is selected from the group consisting of soybean oil, corn oil, sunflower oil, high oleic sunflower oil, olive oil, canola oil, safflower oil, peanut oil, palm oil, cottonseed oil, coconut oil, almond oil, hazelnut oil, grapeseed oil, and combinations thereof.

6. The method of claim 1, wherein the heating is performed by a device selected from the group consisting of a high shear emulsifier, a heat exchanger, and a dielectric heater.

7. The method of claim 1, wherein the non-meat dough is an emulsion.

8. The method of claim 1, wherein the non-meat dough resulting from the mixing has a moisture content of 40% to 67%.

9. The method of claim 1, wherein the non-meat dough resulting from the mixing contains no greater than 20 wt. % of legume flour.

10. The method of claim 1, wherein the dry ingredients further comprise one or more of yeast, tallow, caramel coloring, annatto, chlorophyllin, cochineal, betanin, turmeric, saffron, paprika, lycopene, elderberry juice, pandan, butterfly pea, titanium dioxide, any suitable food colorant, vitamins, or minerals.

11. The method of claim 1, comprising mixing the non-meat food product with at least one of a gravy, a gel, or a condiment.

12. The method of claim 1, wherein the dry ingredients comprise at least one of a starch flour or a legume flour.

13. The method of claim 1, wherein the gradual cooling is performed by a heat exchanger.

14. The method of claim 1, wherein the wet ingredients further comprise water, and the dry ingredients further comprise corn starch and a cereal flour.

15. The method of claim 1, wherein the pressure during the heating of the non-meat dough is about 17.2 bar.

16. The method of claim 1, wherein the non-meat food product does not contain soybean oil or soybean flour.

17. A non-meat composition made by a process comprising production of a non-meat food product without use of extrusion, the process further comprising using the non-meat food product as at least a portion of the non-meat composition, the production comprising:
   mixing (i) dry ingredients comprising vegetable protein with (ii) wet ingredients comprising oil to form a non-meat dough;
   pumping the non-meat dough to at least maintain the dough under pressure and then heating the non-meat dough under pressure, wherein the heating is performed at a temperature of 138° C. to 180° C., and the pressure is from 4.8 bar to 34.5 bar;
   pumping the heated non-meat dough in a high pressure positive displacement pump after the heating; and
   gradually cooling the heated non-meat dough while gradually decreasing pressure on the heated non-meat dough, to form the non-meat food product.

18. The non-meat composition of claim 17, wherein the non-meat composition is formulated for consumption by a human.

19. The non-meat composition of claim 17, wherein the non-meat composition is formulated for consumption by a pet.

20. The non-meat composition of claim 17, wherein the non-meat composition does not contain soybean oil or soybean flour.

\* \* \* \* \*